United States Patent [19]

Patmore et al.

[11] 4,214,400
[45] Jul. 29, 1980

[54] INSECT CAPTURING DEVICE

[75] Inventors: Thomas R. Patmore, Elm Grove; Daniel J. Boyle, Hartland, both of Wis.

[73] Assignee: Champion International Corporation, Stamford, Conn.

[21] Appl. No.: 961,511

[22] Filed: Nov. 17, 1978

[51] Int. Cl.² .......................... A01M 1/10; A01M 1/14
[52] U.S. Cl. ....................................................... 43/121
[58] Field of Search ................... 43/121, 114, 64, 65, 43/107, 132, 65, 131

[56] References Cited

U.S. PATENT DOCUMENTS

| 658,663 | 9/1900 | Lundy | 43/121 |
| 3,908,302 | 9/1975 | Carr | 43/121 |
| 4,044,495 | 8/1977 | Nishimura | 43/121 |

FOREIGN PATENT DOCUMENTS 1027757  3/1978  Canada ..................................... 43/114

Primary Examiner—Othell M. Simpson
Assistant Examiner—Roscoe V. Parker
Attorney, Agent, or Firm—Evelyn M. Sommer

[57] ABSTRACT

An insect capturing device is substantially a hollow pyramid in configuration and includes a closed base portion, opposed front and back walls, opposed side walls, and a cover member. Each of the front and back walls extends upwardly from the base at substantially an acute angle, and includes a central aperture which extends from the top portion of each wall to an intermediate portion thereof. The side walls each extend upwardly from the base at substantially an acute angle, the top edge of each side wall being free and spaced from the cover portion. The cover member is substantially parallel to the base and connects the front and back walls. The cover portion has a width less than that of the base and includes a pair of roof members each of which extends from the top portion of the front and back walls such that it extends over the aperture of its respective wall member. Each lateral end of the cover member extends over a portion of one of the inclined side walls such that the device includes four shaded ramp areas, each having an access opening to the interior of the device.

13 Claims, 9 Drawing Figures

INSECT CAPTURING DEVICE

BACKGROUND OF THE INVENTION

The subject invention relates to a device for trapping insects, such as cockroaches and the like. As is well known, there are many various means for trapping and/or killing insects available to the consumer. For example, insecticides are widely available in spray cans for applying to walking areas such that when the insects come into contact therewith, they are killed. However, this method has the shortcoming that the chemicals used in the insecticide are generally toxic to man and animals. Thus, not only the amount of insecticide, but also the area of application must be restricted. This of course reduces the effectiveness of the method. Other means for capturing and killing insects typically comprise members, such as plastic strips, which include adhesive substances thereon for entrapping the insects. Unfortunately, it has been found that insects such as cockroaches are very alert, having a highly developed tactile sense. Thus, many insects are able to avoid the adhesive type trap, rendering this device less effective than desirable.

It should be noted that while insects such as cockroaches have the trap avoiding characteristics referred to above, they also have tendencies which may be utilized to entrap them. More particularly, cockroaches have a natural tendency to crawl into holes and cracks and shaded areas. Accordingly, it is an object of the subject invention to provide an insect capturing device which employs the natural tendencies of the insects to entrap them.

It is another object of the subject invention to provide an insect capturing device having the above characteristics which is not harmful to man or animals.

It is a further object of the subject invention to provide an insect capturing device having the above characteristics which may be formed from a single blank of paperboard material, and is relatively inexpensive to manufacture.

SUMMARY OF THE INVENTION

In accordance with the above-recited objectives, the insect capturing device of the subject invention is formed from a single sheet of paperboard material which has been appropriately creased and cut. When fully erected, the subject device is substantially a hollow pyramid in configuration having a closed base portion, inwardly inclined front and back walls, inwardly inclined opposed side walls, and a cover member parallel to the base and having a width smaller than the base. The side walls and front and back walls incline at substantially an acute angle relative to the base, the angle of inclination preferably being in a range of 30° to 45°. Each front and back wall cover is generally U-shaped in configuration having a central portion, a pair of opposed leg portions connected to the cover member, and a generally U-shaped aperture disposed between the leg portions. Thus the cover member is spaced from the respective central portion of the front and back wall, and a pair of access openings to the interior of the device is provided. Each of the side wall members is preferably generally trapezoidal in configuration, with the top portion of each side wall being spaced from the cover member to provide a second pair of access openings to the interior of the device. In accordance with the subject invention the cover member includes a pair of roof members each of which extends over a portion of the front or back wall, specifically, over the access opening of the front or back wall. Similarly, each lateral end of the cover member extends over a portion of one of the inclined side walls, specifically including the access opening thereof. Thus, the device is provided with four ramps which are shaded by a portion of the cover member. In operation insects are attracted to the shaded ramp areas of the device. When they reach the top portion of a ramp they fall into the interior of the device and are entrapped by an adhesive substance disposed on the interior portion of the base. The adhesive substance, along with the inclined wall members, prevents the insects from escaping.

DETAILED DESCRIPTION OF THE PREFERRED EMBODIMENTS

Figure 1:
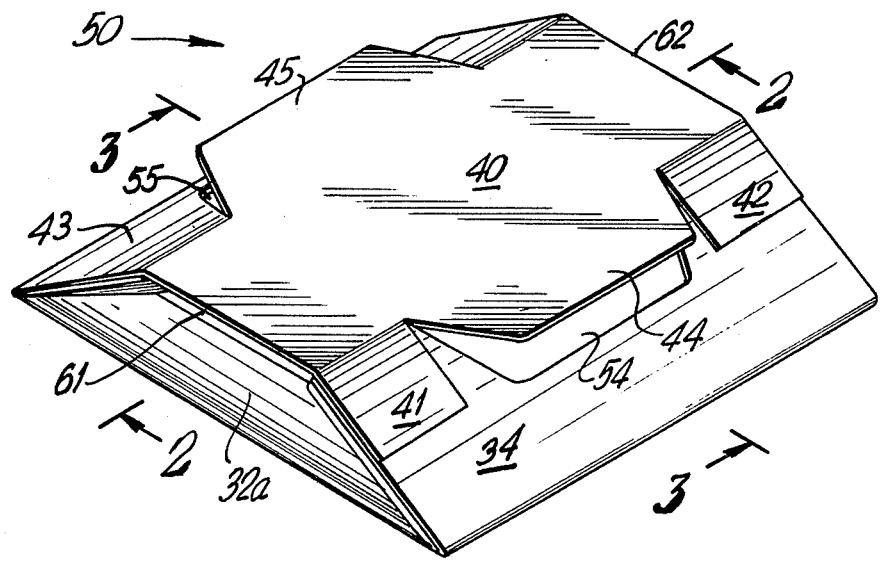
FIG. 1 is a perspective view of the insect capturing device of the subject invention.
Figure 2:
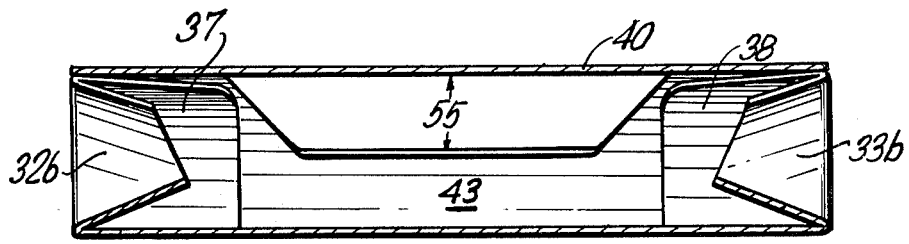
FIG. 2 is a cross-sectional view of the insect capturing device of the subject invention taken along lines 2—2 of FIG. 1.
Figure 3:
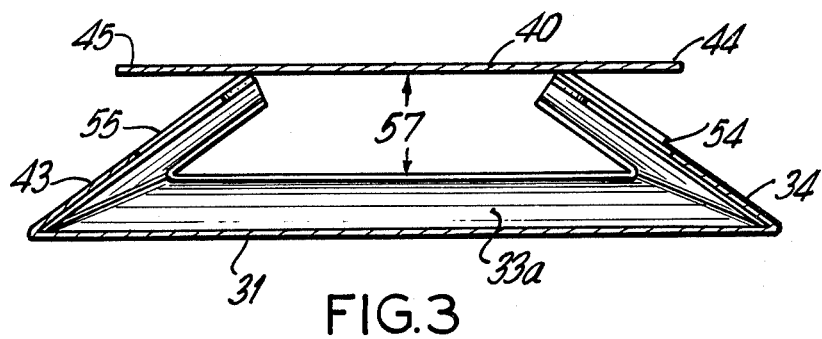
FIG. 3 is a cross-sectional view of the insect capturing device of the subject invention taken along lines 3—3 of FIG. 1.
Figure 4:
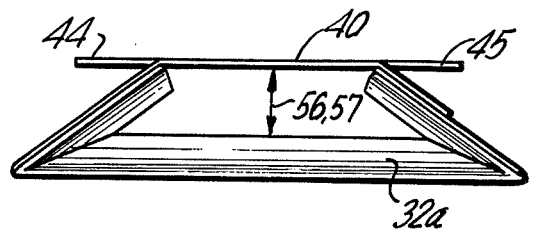
FIG. 4 is a side elevational view of the insect capturing device of the subject invention.
Figure 5:
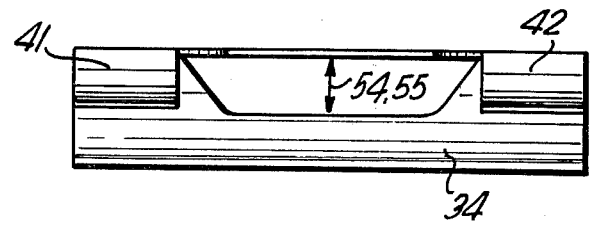
FIG. 5 is a front elevational view of the insect capturing device of the subject invention.
Figure 6:
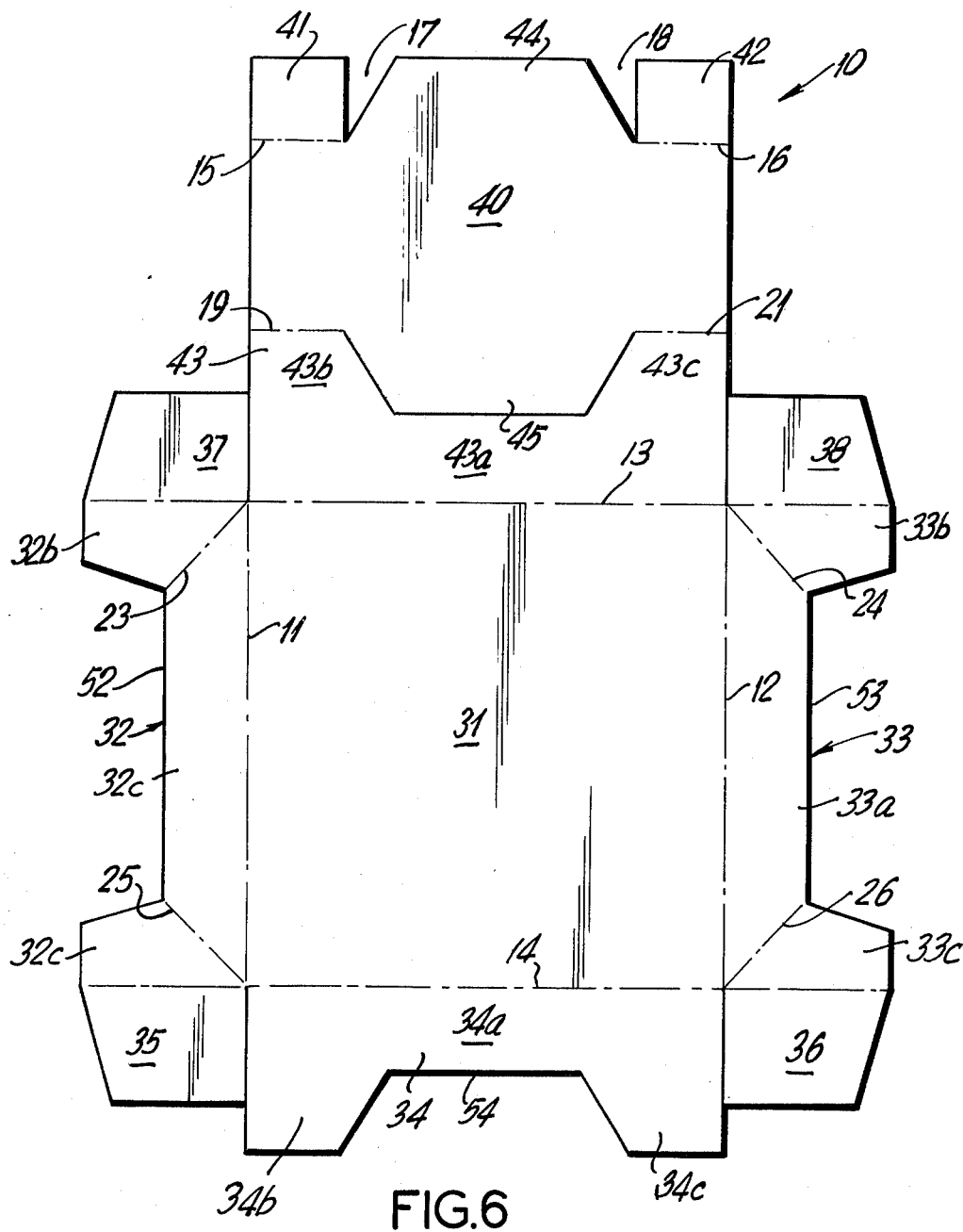
FIG. 6 is a top plan view of the blank for erecting the insect capturing device of the subject invention.

Referring first to FIG. 6, the blank for erecting the insect capturing device of the subject invention is designated generally by reference numeral 10 and it may typically be formed from a single sheet of paperboard material. The blank 10 includes fold lines and cut portions which subdivide the blank into a plurality of panels and flap members. More particularly, the blank 10 includes a pair of vertical fold lines 11 and 12 and a pair of horizontal fold lines 13 and 14 which define the perimeter of a base panel 31. First and second side panels, 32 and 33 respectively, are hingedly connected to the lateral edges of base panel 31 along respective vertical fold lines 11 and 12. Side panels 32 and 33 are preferably generally U-shaped in configuration, each having an elongated central portion 32a and 33a, respectively, a pair of opposed leg members 32b and 32c, and 33b and 33c, respectively, and a generally U-shaped cut portion 52 and 53, respectively, disposed between its respective leg portion. Leg members 32b and 32c are hingedly connected to elongated portion 32a along diagonal fold lines 23 and 25, respectively. Similarly, leg portions 33b and 33c are hingedly connected to elongated portion 33a along diagonal fold lines 24 and 26, respectively.

The subject blank 10 further includes a front panel 34 which is hingedly connected to base panel 31 along horizontal fold line 14. Front panel 34 is preferably generally U-shaped in configuration, having a central portion 34a, opposed leg portions 34b and 34c, and a generally U shaped cut out portion 54 disposed between leg portions 34b and 34c. A pair of front flaps 35 and 36 are hingedly connected to side panels 32 and 33, respectively, along horizontal fold line 14, and are adjacent to, but cut from front panel 34. A back panel 43 is hingedly connected to base panel 31 along horizontal fold line 13. Back panel 43 is preferably generally U-shaped in configuration having a central portion 43a, and a pair of opposed leg portions 43b and 43c. In addition, a pair of back flaps 37 and 38 are included, back flaps 37 and 38 being hingedly connected to side panel leg portions 32b and 33b, respectively, along horizontal fold line 13, and adjacent to, but cut from back panel 43.

Further referring to FIG. 6, the subject blank 10 includes a cover panel 40 which is hingedly connected to back panel 43 along a first pair of spaced horizontal fold lines 19 and 21. Cover panel 41 includes a pair of substantially V shaped cuts 17 and 18, and a second pair of spaced horizontal fold lines 15 and 16 which define first and second tab members 41 and 42 and a central roof member 44 disposed therebetween. Preferably, roof member 44 is trapezoidal in configuration, and complements the configuration of front wall cut portion 54. In addition, at reference numeral 22 the subject blank 10 includes a generally U-shaped cut which is disposed between horizontal fold lines 19 and 21 thus defining a second roof member 45 which is disposed between leg portions 43b and 43c of U-shaped back panel 43. Preferably, second roof member 45 is generally trapezoidal in configuration and substantially identical to first roof member 44.

Figures 7, 8, 9:
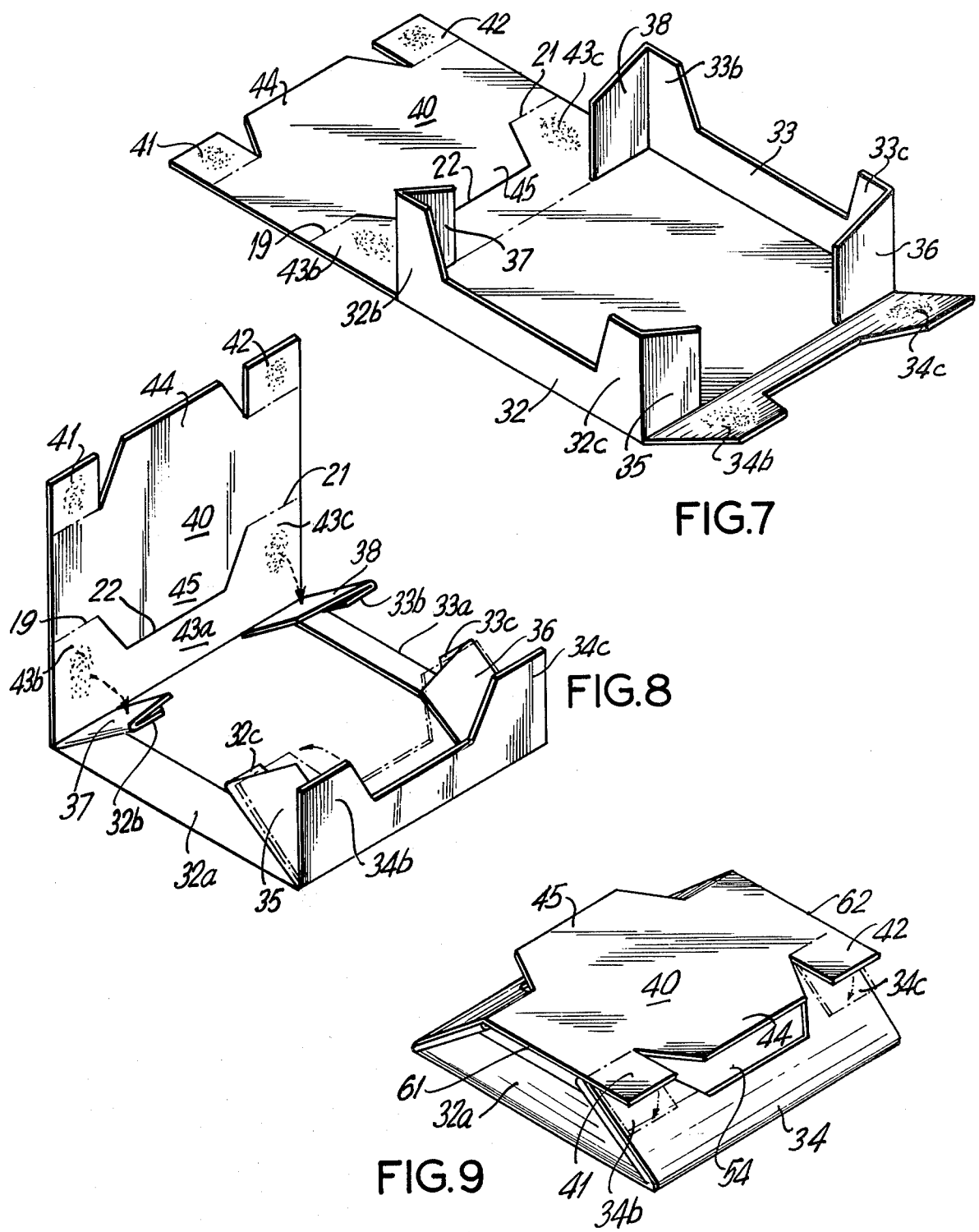
FIGS. 7-9 are perspective views illustrating the formation of the insect capturing device of the subject invention from the blank illustrated in FIG. 6.

Referring to FIGS. 7–9, there is illustrated typical steps by which blank 10 may be erected into the subject insect capturing device. As a prepatory step an adhesive substance which may be mixed with an insecticide is applied to the inner face of base panel 31. In addition, an adhesive such as glue is applied to the inner faces of tabs 41 and 42, back panel leg portions 43b and 43c, and front panel leg portions 34b and 34c. Referring now to FIG. 7, side panels 32 and 33, along with front flaps 35 and 36, and back flaps 37 and 38 are upwardly folded along vertical fold lines 11 and 12. Front panel 34 is upwardly folded along horizontal fold line 14.

As illustrated in FIG. 8, back panel 43 is upwardly folded along horizontal fold line 13, and back flaps 37 and 38 are adhered to back panel leg portions 43b and 43c respectively. Similarly, front flaps 35 and 36 are adhered to front panel leg portions 34b and 34c, respectively. Then both front wall 34 and back wall 43 are pushed inwardly along diagonal fold lines 25 and 26, and 23 and 24, respectively, until they are disposed at a predetermined acute angle relative to base panel 31, preferably in a range of 30° to 45°. Then, as illustrated in FIG. 9, cover panel 40 is folded along spaced horizontal fold lines 19 and 21, and tab members 41 and 42 are adhered to the outer surface of front wall leg portions 34b and 34c respectively, thus completing the formation of the inect capturing device.

Referring now to FIGS. 1–5, the erected insect capturing device of the subject invention, which is designated generally by reference numeral 50, is substantially a hollow pyramid in configuration having a closed base portion 31, first and second opposed inclined side walls 32a and 33a', a front wall 34, a back wall 43, and a cover member 40 connecting the front and back walls, the cover member being substantially parallel to the base 31 and having a width less than that of base 31. As illustrated in the figures, front and back walls 34 and 43 incline from base portion 31 to cover member 40 such that they are disposed at substantially an acute angle relative to base portion 31. Preferably, the angle of inclination of front and back walls 34 and 43 is in a range of 30° to 45°. As further illustrated in the figures, both front and back walls 34 and 43 include a central aperture, 54 and 55, respectively, which is preferably generally U-shaped in configuration and extends from the top portion of each wall member to an intermediate portion thereof. Thus, each front and back wall member is itself preferably generally U shaped in configuration and provides a pair of access openings to the interior of the device. It will be noted that in erecting the subject device cover member 40 is folded along spaced fold lines 19 and 21 such that roof member 45, which is cut from back panel 43 along generally U shaped cut 22, extends outwardly, and forms generally U shaped access opening 55.

Further referring to FIGS. 1–5, side walls 32a and 33a are inclined from the base portion 31 towards cover member 40, and are generally trapezoidal in configuration. However, the top portions of each side wall are spaced from the cover panel thus defining a second pair of access openings 56 and 57 to the interior of the device. Preferably, side walls 32 and 38 are disposed at substantially an acute angle relative to base portion 31, the angle of inclination being preferably in the range of 30° to 45°. Further referring to FIGS. 1–5, it will be noted that cover member 40 includes a pair of roof members 44 and 45 which extend over a portion of front and back walls 34 and 43, respectively. Specifically, roof portions 44 and 45 extend over the central U shaped openings of their respective front and back wall members. Preferably, roof members 44 and 45 are generally trapezoidal in configuration and complement the configuration of their corresponding access openings 54 and 55, respectively. In addition, the lateral edges of the cover members 61 and 62 extend over their respective inclined side wall members 32a and 33a, specifically the access openings 56 and 57. Thus, the device 50 when fully constructed has four inclined ramp areas which are shaded by portions of the cover member 40. It will be appreciated that such a construction takes advantage of the natural tendencies of insects to crawl into cracks and shaded areas. More particularly, in accordance with the subject invention, insects crawl up the ramp areas defined by front and back walls 34 and 43 or side walls 32a and 33a, and then fall into the interior of the device via either U shaped apertures 54 and 55 of the front and back walls, or through the spaces 56 and 57 disposed between the top portions of side walls 32a and 33a and cover member 40. Once in the device the adhesive substance on the base 31, along with the inwardly inclined side walls and front and back walls prevent the insects from escaping.

In summary, the subject invention provides a new and improved device for capturing insects such as cockroaches. The subject device employs the natural tendency of insects to crawl into cracks and spaces, and shaded areas, and thus is more effective than known devices. The subject device is not harmful to man or animals. Because it is formed from a single blank of paperboard material it is relatively simple in construction and inexpensive to manufacture.

While there have been described herein what are at present considered preferred embodiments of the invention, it will be obvious to those skilled in the art that many modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

What is claimed is:

1. An insect capturing device of substantially hollow construction comprising:

a base member;

opposed front and back walls each of which extends inwardly and upwardly from said base member at substantially an acute angle, each of said front and back walls having an aperture extending from the top portion of the wall to an intermediate portion thereof thus providing said device with a first pair of access apertures to the interior portion thereof;

a pair of opposed side walls each of which extends inwardly and upwardly from said base member at substantially an acute angle relative to said base member, the top edge of each of said side walls being free;

a cover member connecting said front and back walls, said cover member having a width less than that of said base member, said cover member being spaced from said side walls so as to provide said device with a second pair of access apertures to the interior portion thereof, each lateral edge of said cover member extending over a portion of one of said side walls;

two pair of support panels, each pair of support panels being connected to a side wall, each said support panel including a leg portion hingedly connected to a flap portion, with each leg portion of said support panels being hingedly connected to the opposed side edges of the associated side wall, and with the flap portion of said support panel underlying and being adhesively connected to the adjacent surface of one of said front and back walls, said support panels functioning to maintain the respective angles of said associated front, back and side walls relative to said base; and an adhesive substance disposed on the inside surface of the base.

2. An insect capturing device as in claim 1 in which the access apertures of said front and back walls are generally U shaped in configuration.

3. An insect capturing device as in claim 1 in which the cover member further includes a pair of opposed roof members, each of which extends over a portion of one of the front and back walls.

4. An insect capturing device as in claim 3 in which each of said roof members extends over the access aperture of its respective front or back wall member.

5. An insect capturing device as in claim 3 in which said roof members are generally trapezoidal in configuration.

6. An insect capturing device as in claim 1 in which said front and back walls are disposed at an angle in the range of 30° to 45° relative to said base.

7. An insect capturing device as in claim 1 in which said side walls are disposed at an angle in the range of 30° to 45° relative to said base.

8. An insect capturing device as in claim 1 which is formed from a single sheet of paperboard material.

9. An insect capturing device as in claim 1 in which an insecticide is mixed with said adhesive substance disposed on the inner surface of the base.

10. An insect capturing device, substantially a hollow pyramid in configuration, said device being formed from a single sheet of paperboard material, said device comprising:

a base member;

opposed front and back walls each of which extends inwardly and upwardly from said base member at an angle in the range of approximately 30° to 45°, each of said front and back walls being generally U shaped in configuration having a central generally U shaped aperture on the top portion thereof so as to provide said device with a first pair of access apertures to the interior thereof;

a pair of opposed side walls, each of which extends inwardly and upwardly from said base member at an angle in the range of approximately 30° to 45°, each of said side walls being generally trapezoidal in configuration, the top edge of each being free;

a cover member connecting said front and back walls, said cover member being substantially parallel to said base member, and having a width less than that of said base member, said cover member being spaced from said sidewalls so as to provide said device with a second pair of access apertures to the interior thereof, each lateral edge of said cover member extending over one of said second pair of access apertures;

two pair of support panels, each pair of support panels being connected to a side wall, each said support panel including a leg portion hingedly connected to a flap portion, with each leg portion of said support panels being hingedly connected to the opposed side edges of the associated side wall, and with the flap portion of said support panel underlying and being adhesively connected to the adjacent surface of one of said front and back walls, said support panels functioning to maintain the respective angles of said associated front, back and side walls relative to said base; and a pair of opposed roof members integral with and extending from said cover member such that each is disposed over one of said first pair of access apertures, said roof members being generally trapezoidal in configuration; and an adhesive substance disposed on the inner surface of said base member.

11. An insect capturing device as in claim 10 in which an insecticide is mixed with the adhesive substance disposed on the inner surface of said base member.

12. A blank for forming an insect capturing device comprising:

a base panel;

first and second side panels hingedly connected to the lateral edges of said base panel, each of said side panels being substantially U shaped in configuration, each including an elongated central portion and a pair of opposed leg members;

a substantially U shaped front panel hingedly connected to the bottom edge of said base panel;

a pair of front flaps each of which being hingedly connected to the bottom edge of one of said side panels, and adjacent to, but cut from said front panel;

a substantially U shaped back panel hingedly connected to the top edge of said base panel;

a pair of back flaps each of which being hingedly connected to one of said side panels, and adjacent to, but cut from said back panel; and a cover panel hingedly connected to said back panel along a pair of spaced horizontal fold lines, said cover panel including a pair of substantially V shaped cuts extending from the top edge thereof to an intermediate portion thereof, thus defining a pair of tab members and a substantially trapezoidal first roof member disposed between said tab members, said cover panel further including a second substantially trapezoidal roof member defined by a generally U-shaped cut portion disposed between said cover member and said back panel.

13. A blank as recited in claim 12 which each of said side panels comprises an elongated central portion and a pair of leg portions hingedly connected to each end of said central portion along a diagonal fold line.

* * * * *